United States Patent
Huber et al.

[11] Patent Number: 5,938,003
[45] Date of Patent: Aug. 17, 1999

[54] ROLLER DRIVE UNIT

[75] Inventors: Thomas Huber, Iffeldorf; Richard Holzner, Dorfen, both of Germany

[73] Assignee: Telair International GmbH, Hausham, Germany

[21] Appl. No.: 09/053,877

[22] Filed: Apr. 1, 1998

[30] Foreign Application Priority Data

Apr. 11, 1997 [DE] Germany .......................... 197 15 192
May 6, 1997 [DE] Germany .......................... 197 19 161

[51] Int. Cl.$^6$ ................................. B65G 13/02
[52] U.S. Cl. ............................................ 198/782
[58] Field of Search .................... 198/782, 780, 198/781.7, 791, 722

[56] References Cited

U.S. PATENT DOCUMENTS

| | | |
|---|---|---|
| 3,690,440 | 9/1972 | Macpherson . |
| 3,712,454 | 1/1973 | McKee . |
| 3,730,330 | 5/1973 | De Good ................................. 198/782 |
| 3,737,022 | 6/1973 | DeNeefe et al. . |
| 4,697,694 | 10/1987 | Huber ..................................... 198/782 |
| 5,033,611 | 7/1991 | Huber ..................................... 198/782 |
| 5,042,645 | 8/1991 | Pritchard ................................. 198/782 |
| 5,048,672 | 9/1991 | Sundseth ................................. 198/782 |
| 5,131,527 | 7/1992 | Huber ..................................... 198/782 |
| 5,183,150 | 2/1993 | Chary et al. . |

FOREIGN PATENT DOCUMENTS

| | | |
|---|---|---|
| OS1956946 | 11/1970 | Germany . |
| 88164381 | 10/1989 | Germany . |
| 4102424A1 | 7/1992 | Germany . |

Primary Examiner—William E. Terrell
Assistant Examiner—Khoi H. Tran
Attorney, Agent, or Firm—Howard & Howard

[57] ABSTRACT

A roller drive unit to propel objects along a conveyor track is disclosed. The roller drive unit comprises a drive roller (30), which can be raised by a lifting mechanism (40) from a lower, resting position into an upper, operating position. The drive roller (30) is powered by an electric motor (20) and a main gear arrangement (50, 55, 60, 34). A first controllable braking mechanism (70) is provided, with which the lifting mechanism (40) can be locked and as a result the drive roller (30) can be kept in an upper, operating position. In addition a second controllable braking mechanism (80) is provided, which acts on the drive shaft of the electric motor (20) and which can prevent rotation of the drive roller (30) even when the electric motor (20) is turned off. When the second braking mechanism (80) is released while the electric motor is turned off (20), an object to be propelled can be shifted over the raised drive roller (30) in a simple manner.

10 Claims, 3 Drawing Sheets

ROLLER DRIVE UNIT

FIELD OF THE INVENTION

The present invention relates to a roller drive unit for propelling objects, in particular cargo containers, on a conveyor track.

DESCRIPTION OF THE PRIOR ART

Roller drive units of this kind are used, for example, to transport items of freight that have been placed on roller-type conveyor tracks. Such items may comprise cargo containers or pallets. A preferred application of the roller drive unit disclosed here is in air freight loading systems, used to transfer cargo containers into the cargo space of an aircraft and stow them for transport. Accordingly, the roller drive unit is installed in the aircraft itself.

When roller drive units of this kind are switched on, the associated rollers are swiveled upward in such a way that they press against the bottom of a cargo container situated above them. This frictional contact enables the torque of the drive rollers to be transmitted to the floor of the cargo container, so that the drive rollers move the container forward.

The intended area of application presents many problems regarding the construction of such roller drive units. Whereas the pressure the drive roller exerts against the floor of the container must be sufficiently high, this pressing force should be "tapped off" from the torque of the motor so that no extra means of raising the drive roller are needed. At the same time, the roller drive unit must have small dimensions and low weight. Because a plurality of such roller drive units are used simultaneously in a conveyor track, their reliability must be particularly great: failure of a single unit can interrupt the loading process.

A roller drive unit of this kind is disclosed in the German Patent Specification DE 41 02 424 A1. In this roller drive unit a drive roller is rotatably mounted on a frame. The drive roller is connected to an electric motor by way of a gear arrangement and can be rotated by this electric motor. The gear arrangement takes the form of a planetary gear system with one input and two outputs. The input of the planetary gear system is connected to the motor, the first output to the drive roller, and the second output to a lifting mechanism with which the drive roller can be raised from a lower, resting position into an upper, operating position.

In this known roller drive unit the roller is designed not to sink automatically into the resting position if the current to the electric motor is turned off while the roller is in its raised position. For this purpose, the roller drive unit is provided with a controllable blocking mechanism that can prevent the drive roller from sinking down from the operating into the resting position. Furthermore, the drive roller is connected to the first output of the planetary gear system by way of a self-locking gear unit.

It is a disadvantage of this roller drive unit that the drive roller cannot rotate when the electric motor is turned off. In order to move the cargo container by hand, the drive roller must be depressed from the upper, operating position into the resting position by releasing the blocking mechanism. Then, however, the drive roller can no longer be used to brake the cargo container, because it is no longer in contact with the lower surface of the container to be moved.

SUMMARY OF THE INVENTION

The object of the present invention is to provide a roller drive unit which overcomes or substantially mitigates the aforementioned disadvantages.

According to the present invention there is provided a roller drive unit for propelling objects on a conveyor track, comprising a frame; a drive roller mounted on the frame; a motor means for rotating the drive roller; a lifting mechanism to raise the drive roller from a lower, resting position into an upper, operating position; a first gear means comprising an input connected to the motor means and two outputs, one of which outputs is connected to the lifting mechanism and the other of which outputs is connected to the drive roller, and the gear means being constructed such that the drive roller can be rotated by a moving object; a first controllable braking mechanism for locking the lifting mechanism in its upper, operating position; and a second controllable braking mechanism for braking the electric motor.

It will be appreciated that the first gear means in accordance with the invention is so constructed that the drive roller can be rotated by a moving object that is to be propelled along a conveyor track by the roller drive unit. Advantageously, therefore, the object to be propelled can be moved by hand over the drive rollers, even when the motor means provided to power the roller drive unit is not in operation. The first controllable braking mechanism locks the lifting mechanism and it is thus possible to keep the drive roller in its upper, operating position and prevent it from sinking back to its resting position when the electric motor is turned off.

In addition, the provision of the second controllable braking mechanism which is used to brake the electric motor permits the advantageous braking of the movement of cargo containers. By immobilizing the drive shaft of the motor when the motor is turned off, cargo container can be prevented from sliding out of position on the conveyor track. An unintentional further transport of the container, in particular on a tilted surface, can therefore be prevented by means of the second controllable braking mechanism. The invention thus provides great flexibility in the applications of the roller drive unit.

Preferably, In an advantageous embodiment of the invention the lifting mechanism comprises retraction means for returning the drive roller from its operating position into its resting position. These retraction means ensure that the drive roller is rapidly and reliably retracted into its resting position when the electric motor is turned off and the first controllable braking mechanism is not locking the lifting mechanism. In a particularly simple embodiment, the retraction devices comprise a retraction spring.

The lifting mechanism preferably comprises a rotatably mounted cam means to raise the drive roller. A cam structure of this kind is simple to manufacture and therefore contributes to an economical implementation of the lifting mechanism.

The first controllable braking mechanism advantageously comprises a rotating brake to engage the cam structure and prevent it from rotating. A rotating brake of this kind ensures particularly secure braking.

In an especially advantageous embodiment of the invention a second gear means is provided between the first controllable braking mechanism and the cam means in order to increase the rotational velocity of the first controllable braking mechanism with respect to the cam means. Therefore a lower braking torque is needed to arrest the cam structure.

It is also advantageous for the first gear means and the second controllable braking mechanism to be disposed concentrically with respect to the axis of rotation of the rotor of the electric motor. The rotor's axis of rotation in turn is perpendicular to the axis of rotation of the drive roller. The result is to ensure a particularly compact construction of the roller drive unit, which is small in both width and height.

In another advantageous embodiment of the invention the frame is so mounted that it can be pivoted about an axis at one end, and the lifting mechanism is disposed on a midline of the frame that is substantially perpendicular to this axis. Owing to this symmetrical arrangement of the roller drive unit its mounting is simple and reliable in operation, because only a slight moment of tilt is generated about the midline.

The present invention will now be described by way of example with reference to the accompanying drawings.

DESCRIPTION OF A PREFERRED EMBODIMENT

Figure 1:
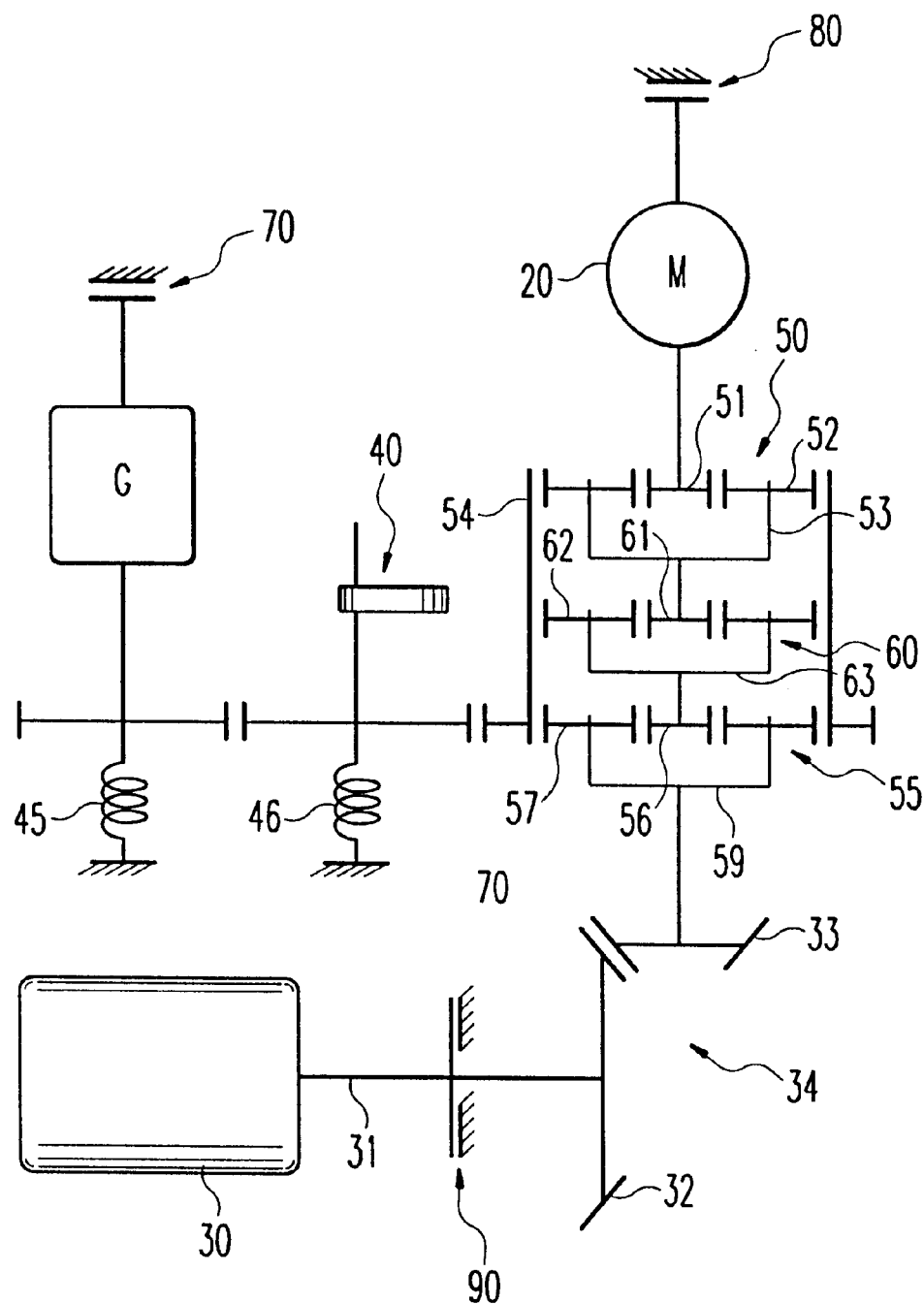
FIG. 1 is a diagram showing schematically the layout of a roller drive unit in accordance with the invention.

FIG. 1 is a layout diagram of an exemplary embodiment of a roller drive unit in accordance with the invention, which serves to transport objects such as cargo containers on a conveyor track in an aircraft.

The roller drive unit comprises an electric motor 20, the drive shaft of which is connected to an input of a main gear unit 50. In this case the main gear unit 50 has a planetary configuration. A sun wheel 51 of the planetary gearing is attached to the drive shaft of the electric motor 20. The sun wheel 51 meshes with the planet wheels 52, which are rotatably mounted on a pinion cage 53 and mesh with a ring gear 54 of the main gear unit 50. The pinion cage 53 is connected to a sun wheel 61 of a first reduction gear unit 60. The sun wheel 61 meshes with the planet wheels 62 of the first reduction gear unit 60. The planet wheels 62 are rotatably mounted on a pinion cage 63. This pinion cage 63 is connected to a sun wheel 56 of a second reduction gear unit 55. The sun wheel 56 meshes with planet wheels 57 of the second reduction gear unit 55, which are rotatably mounted on a pinion cage 59. The pinion cage 59 constitutes a second output of the gear arrangement comprising the main gear unit 50 and the first and second reduction gear units 60 and 55. The ring gears of the first and second reduction gear units 60 and 55 are connected to the ring gear 54 of the main gear unit 50 and constitute a first output of the gear arrangement comprising the main gear unit 50 and the first and second reduction gear units 60 and 55. The second output 59 of the gear combination comprising the main gear unit 50 and the first and second reduction gear units 60 and 55 is connected to a second bevel wheel 33 of a bevel gearing 34. A first bevel wheel 32 of the bevel gearing 34 is attached to a drive shaft 31 of a drive roller 30. In the present exemplary embodiment the drive shaft of the electric motor 20 is disposed perpendicular to the axis of rotation of the drive roller 30. The bevel gearing 34 is thus required to transmit torques between the drive roller 30 and motor 20.

The drive shaft 31 of the drive roller 30 is lightly braked in a known manner by means of a braking mechanism 90, in order to enable the drive roller to be raised out of its resting position.

The first output 54 of the gear arrangement, which is formed by the conjoined ring gears, is connected to a lifting mechanism 40. This lifting mechanism 40 preferably comprises a rotatably mounted cam structure. The lifting mechanism 40 serves to raise the drive roller 30 from a lower, resting position into an upper, operating position. In order to ensure that the drive roller 30, when it is in the upper, operating position, can be returned to the resting position, the lifting mechanism 40 comprises retraction devices in the form of torsion retraction springs 45 and 46. The cam structure 40 is connected to a first controllable braking mechanism 70 by way of a gear unit G. This first controllable braking mechanism 70 serves to block the lifting mechanism 40, in particular when the drive roller 30 is in its upper, operating position by means of the gear unit G, the velocity of rotation of the first controllable braking mechanism 70 can be increased with respect to the cam structure 40. Therefore only a slight braking torque is needed for the cam structure 40 to be blocked by the first controllable braking mechanism 70.

Attached to the drive shaft of the electric motor 20 is a second controllable braking mechanism 80, which is used to brake the motor 20. By means of the second controllable braking mechanism 80 the drive shaft of the motor 20 can be immobilized, so that by way of the gear units 50, 55 and 60 the drive roller 30 can be braked or blocked.

When the electric motor 20 is turned on, the braking mechanism 90 simultaneously brakes the pinion cage 53. The torque otherwise transmitted from the motor 20 to the drive roller is diverted to the planet wheels 52 of the main gear unit 50 and thus to the ring gear 54 and the lifting mechanism 40 connected thereto. The result is that rotation of the cam structure of the lifting mechanism 40 raises the drive roller 30 out of its resting position into its upper, operating position. Because of the lifting of the drive roller 30, the retraction springs 45 and 46 of the lifting mechanism are placed under tension. When the cam structure has abutted against its stop, the movement of the ring gear 54 is arrested. The torque of the motor 20 is now transmitted by way of the pinion cage 53 to the drive roller 30, which then begins to rotate.

After the drive roller 30 has reached its upper, operating position, the first controllable braking mechanism 70 is actuated, so that the lifting mechanism 40 is blocked. As a result, the drive roller 30 is prevented from sinking back into its resting position. If the raised drive roller 30 comes into contact with a container situated above the roller, this container is propelled by the rotational movement of the drive roller 30.

When the electric motor 20 is turned off, the first braking mechanism 70 remaining active, the drive roller 30 continues to be kept in its upper, operating position. Because no self-locking gearing is present between the motor 20 and roller 30, the container that rests on the roller 30 can continue to move, or be pushed further by hand, as long as the second braking mechanism 80 is not actuated. It is thus easy to displace the container even though the drive roller 30 remains in its raised position.

To prevent an unintentional continued movement of the cargo container, in particular on a tilted surface, or to brake a moving cargo container, the second braking mechanism 80 can be applied. As a result, the drive shaft of the motor 20 is immobilized, so that no further rotation of the drive roller 30 is possible. Because of the frictional engagement between cargo container and drive roller 30, the container is securely held even if the conveyor track is tilted. Unintended slippage is impossible.

When the first braking mechanism 70 is released, so that the blockage of the lifting mechanism 40 is removed, the retraction springs 45 and 46 move the cam structure backwards, returning the drive roller 30 from its upper, operating position into its resting position.

In the roller drive unit in accordance with the invention as shown in FIG. 1 the gear unit G is provided between the first controllable braking mechanism 70 and the cam structure 40 by means of this gear unit G the speed of rotation of the first braking mechanism 70 with respect to the cam structure 40 is increased. As a result, the first controllable braking mechanism 70 advantageously needs to generate only a small braking torque in order to block the cam structure 40.

Figure 2:
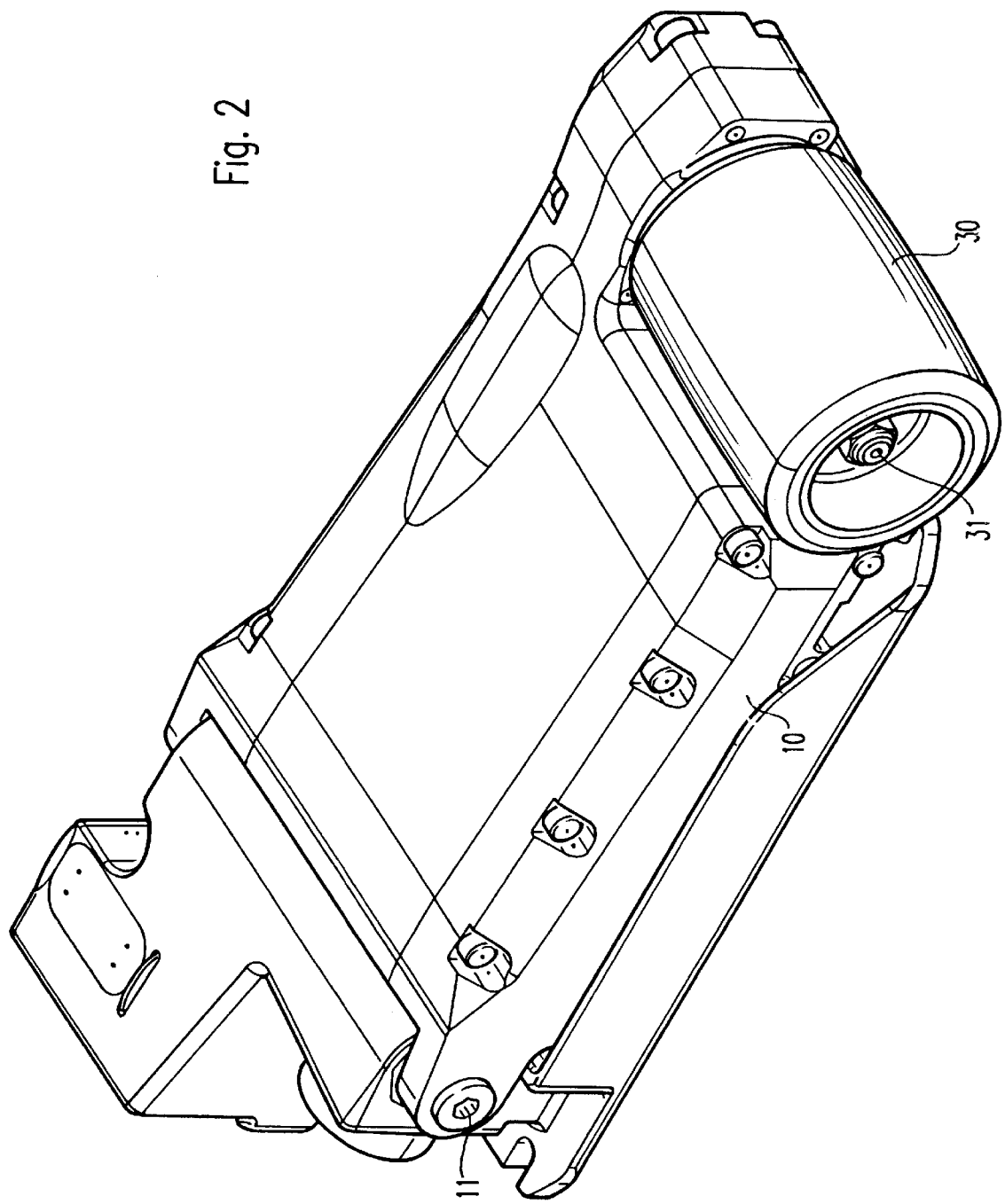
FIG. 2 is a perspective view of the roller drive unit.

FIG. 2 shows a perspective view of the roller drive unit in accordance with the invention described above with reference to the equivalent connection diagram of FIG. 1. The drive roller 30 is rotatably mounted at one end of a frame 10. The axis of rotation of the drive shaft 31 of the drive roller 30 is disposed parallel to an axis of rotation 11 at the other end of the frame 10. It is about this axis 11 that the drive roller 30 pivots when it moves from its lower, resting position into its upper, operating position and back. The electric motor, the first braking mechanism, the lifting mechanism, the gear arrangements and the retraction springs are disposed within the frame 10, protected by a metal housing. Because the axis of rotation 11 is disposed at the end of the frame 10 opposite to the drive roller 30, the motor 20 and the gear units 50, 55 and 34 are raised along with the drive roller 30 when the latter is lifted.

Figure 3:
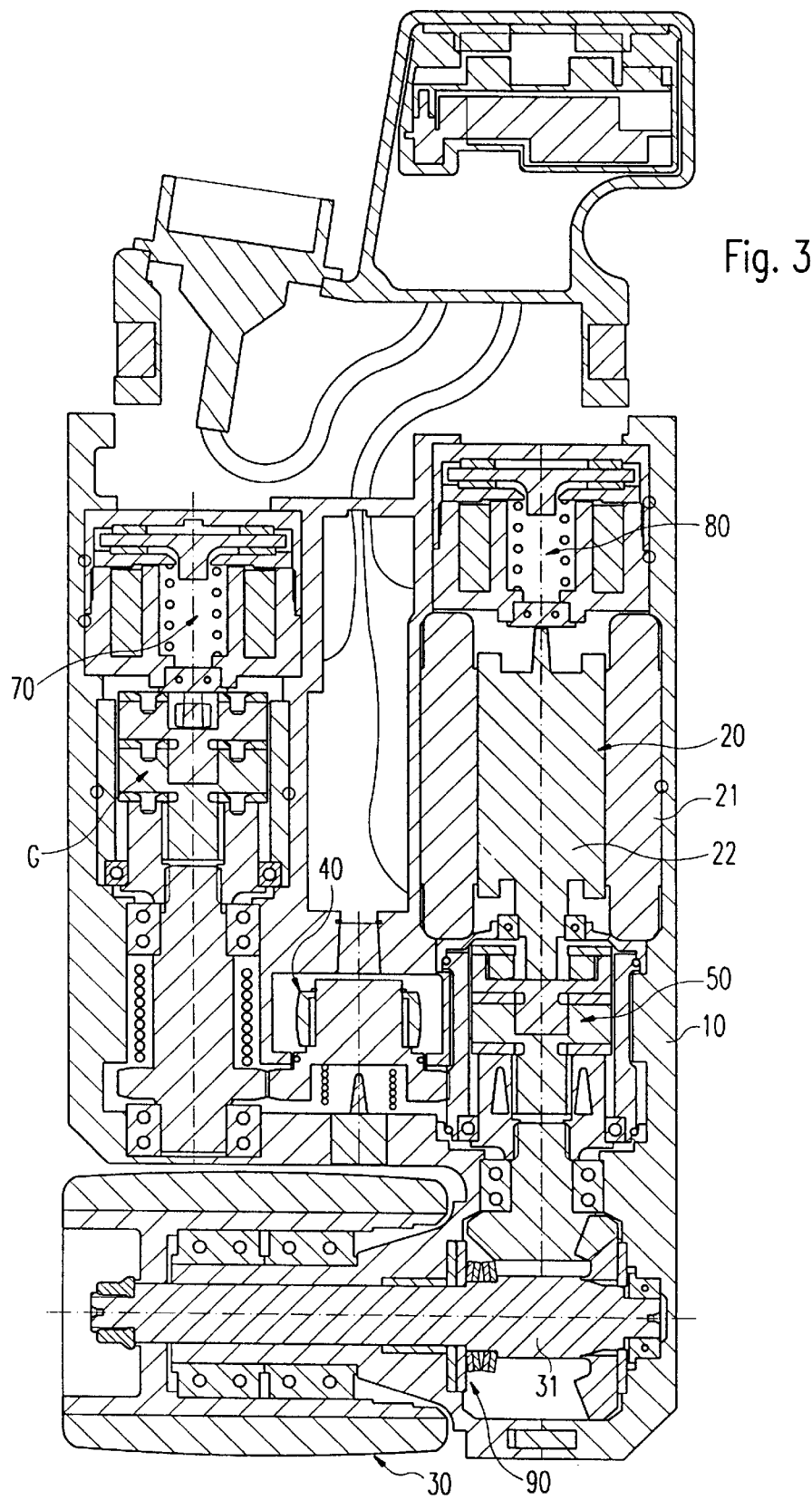
FIG. 3 is a horizontal section through the roller drive unit shown in FIG. 2.

FIG. 3 shows a horizontal section through the roller drive unit shown in FIG. 2. The electric motor 20 is constructed in the usual manner with a rotor 22 and a stator 21, the latter being fixedly mounted in the frame 10. The axis of rotation of the rotor 22 is oriented lengthwise, in the direction in which objects are moved along the conveyor track, and is thus perpendicular to the axis of rotation of the drive roller 30. The main gear unit 50 and the second controllable braking mechanism 80 are disposed concentrically with respect to the axis of rotation of the rotor 22. This arrangement advantageously makes it possible for the roller drive unit in accordance with the invention to be very compactly constructed. In particular, this construction keeps the width of the roller drive unit small, which is advantageous for employment of the roller drive unit in an aircraft. FIG. 3 further shows that the axis of rotation of the first controllable braking mechanism 70 and the—concentric—axis of rotation of the associated gear unit G are disposed parallel to the axis of rotation of the rotor 22. The axis of rotation of the cam structure 40 is also parallel to the axis of rotation of the rotor 22. By these means, likewise, the compactness of the roller drive unit is increased.

In the roller drive unit according to the exemplary embodiment presented here, the lifting mechanism 40 is advantageously disposed substantially in a midline of the frame 10 perpendicular to the axis of rotation 11. Because of this symmetrical arrangement of the lifting mechanism 40, the mounting of the pivotable frame 10 can be made simple, so that during lifting only a slight moment of tilt is generated.

What is claimed is:

1. A roller drive unit for propelling objects on a conveyor track, comprising a frame;

a drive roller mounted on the frame;

a motor means for rotating the drive roller;

a lifting mechanism to raise the drive roller from a lower, resting position into an upper, operating position;

a first gear means comprising an input connected to the motor means and two outputs, one of which outputs is connected to the lifting mechanism and the other of which outputs is connected to the drive roller, and the gear means being constructed such that the drive roller can be rotated by a moving object;

a first controllable braking mechanism for locking the lifting mechanism in its upper, operating position; and a second controllable braking mechanism for braking the electric motor.

2. A roller drive unit as claimed in claim 1, wherein the lifting mechanism comprises a retraction means for returning the drive roller from its operating position to its resting position.

3. A roller drive unit as claimed in claim 2, wherein the retraction means comprises at least one retraction spring.

4. A roller drive unit as claimed in claim 1, wherein the lifting mechanism comprises a rotatably mounted cam means.

5. A roller drive unit as claimed in claim 4, wherein the first controllable braking mechanism comprises a rotating brake to prevent the cam means from rotating.

6. A roller drive unit as claimed in claim 5, wherein a second gear means is provided operationally located between the first controllable braking mechanism and the cam means in order to increase the rotational velocity of the first controllable braking mechanism with respect to the cam means.

7. A roller drive unit as claimed in claim 1, wherein the frame is pivotally mounted at one end about an axis of rotation, and at the other end of the frame the drive roller is mounted with its axis of rotation parallel to said axis about which the frame pivots.

8. A roller drive unit as claimed in claim 7, wherein the motor comprises a rotor and a stator, the first gear means and the second controllable braking means being disposed concentrically with respect to the axis of rotation of the rotor, which axis is perpendicular to the axis of rotation of the drive roller.

9. A roller drive unit as claimed in claim 8, wherein the lifting mechanism comprises a rotatably mounted cam means with a second gear means, the axis of rotation of the first controllable braking means and an axis of rotation of said second gear means both being disposed in parallel with an axis of rotation of the cam means and in parallel with the axis of rotation of the rotor.

10. A roller drive unit as claimed in claim 7, wherein the lifting mechanism is disposed substantially in a midline of the frame perpendicular to the axis about which the frame pivots.

* * * * *